United States Patent
Paneah et al.

(10) Patent No.: US 10,394,747 B1
(45) Date of Patent: Aug. 27, 2019

(54) IMPLEMENTING HIERARCHICAL PCI EXPRESS SWITCH TOPOLOGY OVER COHERENT MESH INTERCONNECT

(71) Applicant: Mellanox Technologies, Ltd., Yokneam (IL)

(72) Inventors: Peter Paneah, Nesher (IL); Carl G. Ramey, Westborough, MA (US); Gil Moran, Meitar (IL); Adi Menachem, Hod Hasharon (IL); Christopher J. Jackson, Westford, MA (US); Ilan Pardo, Ramat Hasharon (IL); Ariel Shahar, Jerusalem (IL); Tzuriel Katoa, Tveria (IL)

(73) Assignee: Mellanox Technologies Ltd., Yokneam (IL)

( * ) Notice: Subject to any disclaimer, the term of this patent is extended or adjusted under 35 U.S.C. 154(b) by 77 days.

(21) Appl. No.: 15/609,433

(22) Filed: May 31, 2017

(51) Int. Cl.
  *G06F 13/38* (2006.01)
  *G06F 13/40* (2006.01)
  *G06F 13/36* (2006.01)
  *G06F 13/42* (2006.01)

(52) U.S. Cl.
  CPC ........ *G06F 13/4282* (2013.01); *G06F 13/404* (2013.01); *G06F 13/4022* (2013.01); *G06F 2213/0026* (2013.01)

(58) Field of Classification Search
  CPC ........... G06F 13/38; G06F 13/40; G06F 13/36
  See application file for complete search history.

(56) References Cited

U.S. PATENT DOCUMENTS

| | | | |
|---|---|---|---|
| 5,835,766 A | 11/1998 | Iba | |
| 6,067,603 A * | 5/2000 | Carpenter | G06F 12/0813 710/104 |
| 6,430,657 B1 | 8/2002 | Mittal | |
| 6,535,958 B1 | 3/2003 | Fuoco | |
| 8,738,860 B1 | 5/2014 | Griffin | |
| 9,514,006 B1 | 12/2016 | Busaba | |
| 9,842,031 B1 | 12/2017 | Kharatishvill | |
| 2001/0049714 A1 | 12/2001 | Kikuchi | |
| 2002/0172199 A1 | 11/2002 | Scott | |
| 2006/0143395 A1 | 6/2006 | Zohar | |
| 2007/0203910 A1 | 8/2007 | Ferguson | |
| 2008/0183979 A1 | 7/2008 | Larson | |
| 2010/0191920 A1* | 7/2010 | Fang | G06F 12/0835 711/146 |
| 2010/0318693 A1* | 12/2010 | Espig | G06F 13/24 710/46 |
| 2011/0029498 A1 | 2/2011 | Ferguson | |
| 2012/0254587 A1* | 10/2012 | Biran | G06F 9/3877 712/34 |

(Continued)

*Primary Examiner* — David E Martinez
(74) *Attorney, Agent, or Firm* — Fish & Richardson P.C.

(57) ABSTRACT

A computing system comprises one or more cores. Each core comprises a processor. In some implementations, each processor is coupled to a communication network among the cores. In some implementations, a switch in each core includes switching circuitry to forward data received over data paths from other cores to the processor and to switches of other cores, and to forward data received from the processor to switches of other cores. Also disclosed are techniques for implementing hierarchical serial interconnects such as a PCI Express switch topology over a coherent mesh interconnect.

20 Claims, 5 Drawing Sheets

(56) References Cited

U.S. PATENT DOCUMENTS

| | | | |
|---|---|---|---|
| 2013/0080673 A1* | 3/2013 | Feehrer | G06F 13/24 710/268 |
| 2013/0151750 A1 | 6/2013 | Kanigicherla | |
| 2013/0191599 A1 | 7/2013 | Busaba | |
| 2013/0243190 A1 | 9/2013 | Yang | |
| 2013/0339805 A1 | 12/2013 | Aho | |
| 2013/0346708 A1 | 12/2013 | Nashimoto | |
| 2014/0368524 A1 | 12/2014 | Srinivasan | |
| 2015/0150003 A1 | 5/2015 | Emelyanov et al. | |
| 2015/0234745 A1 | 8/2015 | Roy | |
| 2016/0239432 A1 | 8/2016 | Zhuang | |
| 2016/0267018 A1 | 9/2016 | Shimizu | |
| 2016/0378658 A1 | 12/2016 | Gschwind | |
| 2016/0378659 A1 | 12/2016 | Gschwind | |
| 2017/0039144 A1 | 2/2017 | Wang | |
| 2017/0116118 A1 | 4/2017 | Artieri | |
| 2017/0322885 A1 | 11/2017 | Mikherjee | |
| 2018/0107604 A1 | 4/2018 | Dooley | |
| 2018/0117810 A1 | 5/2018 | Gschwind | |

\* cited by examiner

IMPLEMENTING HIERARCHICAL PCI EXPRESS SWITCH TOPOLOGY OVER COHERENT MESH INTERCONNECT

BACKGROUND

This description relates to computing in parallel processing environments.

FPGAs (Field Programmable Gate Arrays) and ASICs (Application Specific Integrated Circuits) are two exemplary approaches for implementing customized logic circuits. Costs associated with ASICs include verification, physical design, timing closure, and non-recurring costs. Unlike an ASIC, an FPGA is reprogrammable in that it can be reconfigured for each application and changed even after the design has been shipped to customers, much like software can be updated. However, FPGAs are typically more expensive than an ASIC. FPGAs typically consume more power and lower performance compared to an ASIC.

Multicore systems (e.g., tiled processors) use parallel processing to achieve some features of both ASICs and FPGAs. For example, some multicore systems are power efficient like an ASIC because they use custom logic for some functions, and reconfigurable like FPGAs because they are programmable in software.

PCI Express® or PCIe is a known high-speed serial computer expansion bus standard. Modern multicore core systems on a chip (SOC) that implement high rate PCIe root complex, often have multiple downstream ports and internally embed PCIe switch functionality. PCI Express lanes of a wide port (e.g. 16 full duplex lanes) can be bifurcated into multiple narrower ports (e.g., 8, downstream ports of two full duplex lanes) that can be dedicated channels for various devices in a system. PCIe base address range definitions (BAR's) are programmed and used for PCIe controller address mapping.

Coherent mesh interconnections are used for many-core scalable platforms. Routing packets in such mesh interconnection use routers of neighboring tiles and a routing function to send data from a source tile coordinate to a destination tile coordinate, or to an edge of a mesh array. Transactions running to IO peripherals traverse the mesh interconnect towards a protocol translation block that is located outside of the mesh array. In the protocol translation block, coherent bus transactions are converted by a PCIe controller to PCI transaction layer packets (TLPs).

SUMMARY

In a single switch hierarchy, transactions that target external endpoints beyond a first switching level have to match internally configured BARs at each tile, traverse internal switch topology through the mesh level, get converted by a protocol translation block to standard PCIe configuration TLPs, and continue downstream routing through external PCIe topology in a standard way. This approach requires all PCI BARs to be configured at the first level implemented in the tiles, resulting in higher area and power consumption, and reducing scalability when the number of tiles as well as number of narrow downstream ports grows. For example, in 64-tile integration with 64 narrow ports, where each narrow port has x2 lanes, and eight narrow ports share the same wide PCI Express Controller, 64 sets of BARs would be required in each of the tiles.

The proposed hierarchical implementation reduces the cost to eight BAR sets at the tile level (duplicated), and eight BAR sets at the PCIe Controller (configured once).

When multiple wide ports aggregate more than an amount of bandwidth available to a single mesh link, and additionally serializer/deserializer (a pair of blocks that convert data between serial data and parallel interfaces in each direction) lanes associated with different wide ports are located on different sides of the SOC, there may be an advantage to route traffic through the mesh interconnection towards the direction of the actual PCI Express® (PCIe) controller. This scheme may achieve higher throughput and lower latency compared to a scheme that avoids routing through the mesh. Each PCIe controller may further implement as an on-device PCIe switch function for the PCIe lanes under its supervision, providing bifurcation ranging from one wide downstream port (e.g. 1×16) to multiple narrower downstream ports (e.g. eight×2).

Portions of the hierarchical PCIe switch topology are implemented within the coherent mesh, using PCIe BAR definitions for choosing the coordinates towards each attached PCIe controller, where each PCIe controller is responsible for one wide PCIe port. All the cores have one root complex, with a single root port function and core load/store transactions towards PCIe address ranges are routed through the mesh interconnect as memory mapped IO using the coherent protocol packets. This scheme in effect provides a first level PCIe switch without using PCIe TLPs. The first level of the PCIe switch is implemented on all tiles.

According to an aspect, a system includes a multicore processor device including a plurality of cores, with multiple ones of the plurality of cores each including a processor and switching circuitry configured to couple the processor to a network among the plurality of cores to provide a coherent mesh interconnect. The system is configured to implement a hierarchical serial interconnect switch topology within the coherent mesh interconnect that interconnects the plurality of cores in the multi-core processor, choose coordinates towards each of one or more attached peripheral serial interconnect base controllers, where each peripheral serial interconnect base controller is responsible for one wide peripheral serial interconnect base port, and route load/store transactions from the cores in the coherent mesh interconnect towards the peripheral serial interconnect base address ranges defined addresses ranges as memory mapped IO transactions using coherent protocol packets.

Other aspects include methods processor devices and computer program products on non-transitory computer readable hardware storage devices that can be either volatile or non-volatile devices such as memory and/or storage.

Aspects address bandwidth scalability limitations when connecting multiple PCIe controllers to a many-core platform, while implementing PCIe switch topology under a single root complex. Aspects also address BAR scalability and matching addresses allocated by an operating system to a standard PCI root complex driver. Other aspects address issues resulting from atomicity of PCI configuration transactions, meaning that all distributed configuration registers are viewed as being updated at once.

Other features and advantages of the invention will become apparent from the following description, and from the claims.

DESCRIPTION

1 Exemplary System Overview

The system described in this section (with reference to FIGS. 1A and 1B) provides an overview of various aspects of a parallel processing environment that can be used for a variety of the techniques described in other sections.

A multicore processor can be manufactured as a chip containing multiple processing engines or cores. Using multiple cores to process applications can provide greater computing throughput and also lower power. There are many challenges to building a multicore processor. These include the challenges of how to connect the cores to each other efficiently, how to manage data sharing between the cores, how to supply data from input-output devices to the cores in a coherent manner, and how to construct operating systems for multicore processors. Bus based multicore chips use a bus to connect the cores, but buses may be a throughput bottleneck and may also consume a lot of power. An alternative way to connect the cores is to use a point-to-point network such as a mesh network or a ring network. Networks such as a mesh have switches arranged in a grid pattern in which neighboring switches are connected to each other. When the cores include a switch component for a network such as a mesh, the cores can be laid out in a simple rectangular tiled pattern. Such multicore chips are called tiled multicore processors. Because the conductor paths are short in tiled multicore processors, signals can travel short distances when neighboring cores need to communicate. Tiled multicore processors generally consume lower power than bus based multicore processors.

Figure 1A:
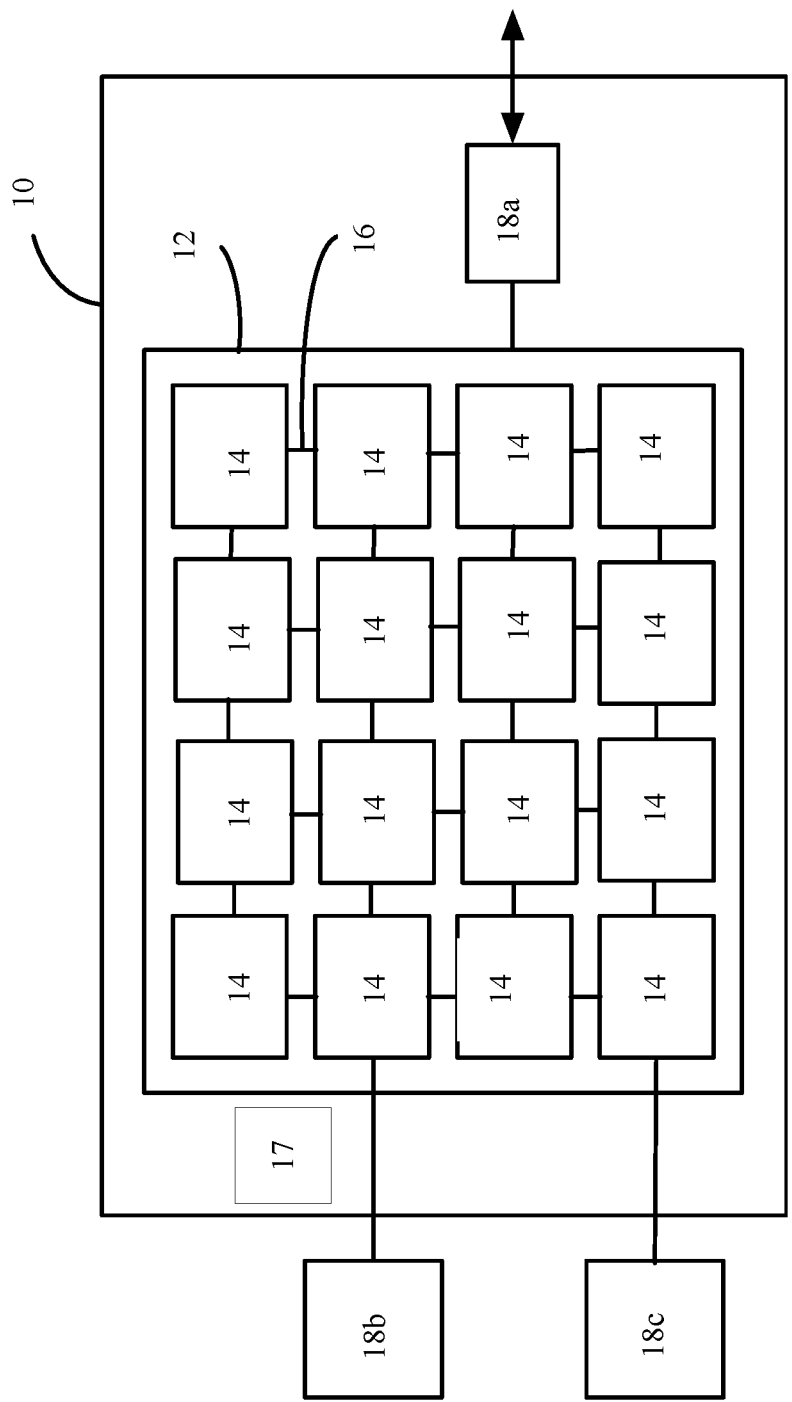
FIG. 1A is a block diagram of a tiled integrated circuit.

Referring to FIG. 1A, an integrated circuit 10 (or "chip") includes an array 12 of interconnected tiles 14. Each of the tiles 14 is a functional unit that includes a processor (or "processor core") and a switch that forwards data from other tiles to the processor and to switches of other tiles over data paths 16. The switch is coupled to the processor so that data can be sent to or received from processors of other tiles over the communication fabric formed by the switches and data paths. The integrated circuit 10 includes other on-chip circuitry such as input/output (I/O) interface circuitry to couple data in and out of the circuit 10, and clock distribution circuitry to provide clock signals to the processors of the tiles.

The integrated circuit 10 shown in FIG. 1A includes a two-dimensional array 12 of (e.g., rectangular) tiles 14 with data paths 16 between neighboring tiles to form a mesh network. The data path 16 between any two tiles can include multiple conductor paths (or "wires") to support parallel channels in each direction. Optionally, specific sets of conductors between two tiles can be dedicated to different mesh networks that can operate independently. The integrated circuit 10 also includes an entity 17 that convert from a mesh protocol to a protocol for a serial bus device.

Alternative network configurations include buses, rings, crossbars, hypercubes, trees, or networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 16 from one or more tiles at the edge of the network can be coupled out of the array 12 of tiles 14 (e.g., over I/O pins) to an on-chip device 18a, an off-chip device 18b, or a communication channel interface 18c, for example. Multiple conductors of one or more parallel channels can be multiplexed down to a fewer number of pins or to a serial channel interface. For example, the conductors for one or more channels can be multiplexed onto a high-speed serial link (e.g., SerDes) or a memory controller interface (e.g., a memory controller for DDR or Dynamic RAM—also known as DRAM). The memory controller can be implemented off-chip or in logic blocks within a tile or on the periphery of the integrated circuit 10.

The following exemplary implementations are described in the context of tiles that have the same structure and functionality. Alternatively, there can be multiple "tile types" each having different structure and/or functionality. For example, tiles that couple data off of the integrated circuit 10 can include additional circuitry for I/O functions.

Figure 1B:
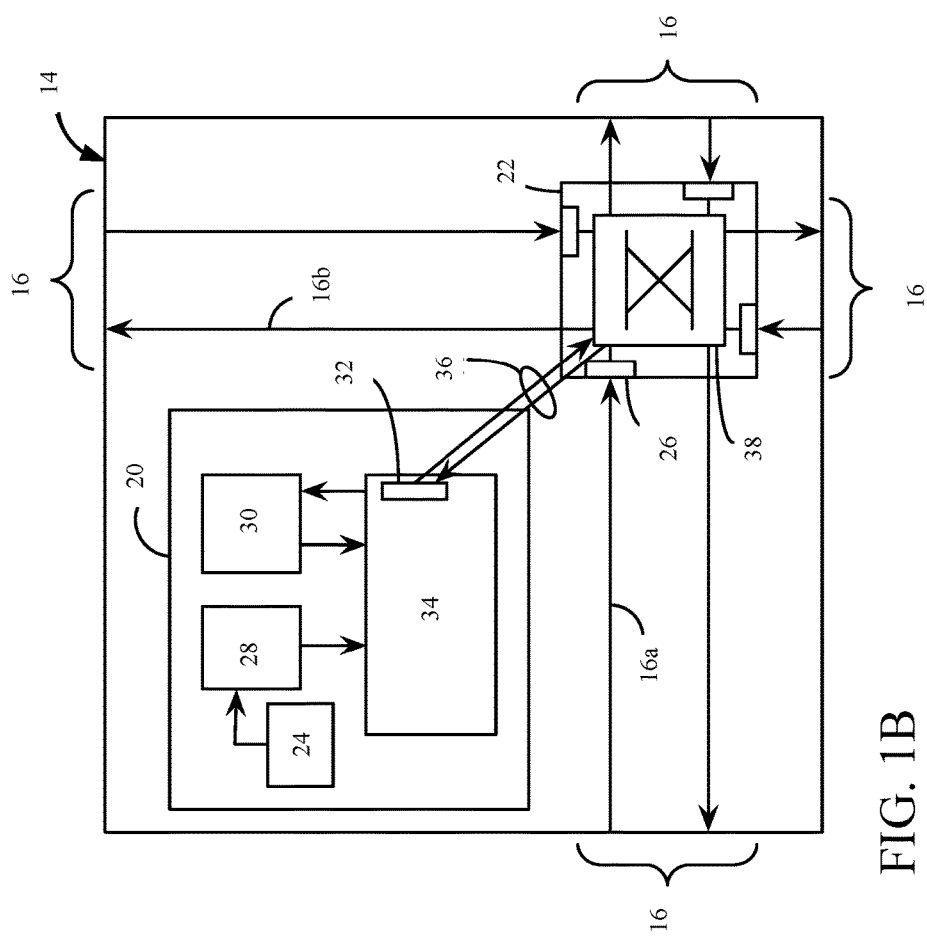
FIG. 1B is a block diagram of a tile.

Referring to FIG. 1B, a tile 14 includes a processor 20, a switch 22, and sets of incoming conductors 16a and outgoing conductors 16b that form the data paths 16 for communicating with neighboring tiles. The processor 20 includes a program counter 24, an instruction memory 28, a data memory 30, and a pipeline 34. The processor 20 can use any of a variety of pipelined architectures. The pipeline 34 includes pipeline registers, functional units such as one or more arithmetic logic units (ALUs), and temporary storage such as a register file. The stages in the pipeline 34 include, for example, instruction fetch and decode stages, a register fetch stage, instruction execution stages, and a write-back stage.

Either or both of the instruction memory 28 and data memory 30 can be configured to operate as a cache for off-chip memory. The cache hierarchy can take many forms, and the description here is just one example. For example, the instruction memory 28 includes an instruction cache that caches instructions, which can be a level 1 instruction cache (L1I), and the data memory 30 includes a data cache that caches data, which can be a level 1 data cache (L1D). Both the L1I cache and the L1D cache can be backed up by a level 2 unified cache (L2U) that is usually larger in size than either of the L1 caches. The caches are controlled by a cache controller.

On a cache miss from the L1I or L1D caches, the L2U cache is checked. If the data is found in the L2U cache, then a cache miss can be averted. If the instruction or data is not found in the L2U, then the instruction or data is fetched from outside the tile. Typically, the processor checks the cache in another tile called the home tile for that particular address that missed. In some implementations, the L2U caches in the other tiles serve as a large distributed L3 cache.

In other implementations, there is a directory in the home tile and a unified L3 cache on the path to the memory controller. If the home tile directory has an entry for the data item (within a home location of a home cache in the home tile), the home tile directory can signal the owner of the data item to send the data item) to the requesting tile. If even the home tile directory causes a cache miss, then, as an example, the home tile directory handles the cache miss by sending the cache request to external memory (to DRAM typically, possibly through the L3 cache) and obtains the data item from the external memory. The cache miss from the requesting tile gets turned into a message that traverses the network to get to the home tile. Similarly, the miss from the home tile to DRAM traverses the network.

Sometimes, instead of checking a home tile directory on a cache miss to the cache within a tile, the request is sent directly outside the chip to external DRAM memory.

The tile 14 can also include a cache controller that performs actions to ensure that cache coherence is maintained in the whole chip. Typically, the cache coherence information for a given cache line is maintained at the home tile for that cache line. The coherence information is stored in a directory to store the current state of the cache line. The home location, within a home tile, for a given cache line can also be determined by hashing the cache line address to yield a home location. The home location can also be modified as the program executes. Data that has a home location in a home cache of a particular home tile is said to be "homed in" that particular tile.

The processor 20 can be multithreaded and/or have capabilities of a Very Long Instruction Word (VLIW) processor, a superscalar processor, or a vector processor.

Together the switches 22 in a multicore chip provide the communications infrastructure for all the cores. Switches can be built in many ways. As one example, the switch 22 includes input buffers 26 for temporarily storing data arriving over incoming conductors 16a, and switching circuitry 38 (e.g., a crossbar fabric) for forwarding data to outgoing conductors 16b or the processor 20. The input buffering provides pipelined data channels in which data traverses a data path 16 from one tile to a neighboring tile in predetermined number of clock cycles (e.g., a single clock cycle). This pipelined data transport enables the integrated circuit 10 to be scaled to a large number of tiles without the need to limit the clock rate to account for effects due to conductor lengths such as propagation delay or capacitance. (Alternatively, the buffering could be at the output of the switching circuitry 38 instead of, or in addition to, the input.)

The switch provides "dynamic routing" for communication messages that result from cache misses or other cache coherence related transactions. In dynamic routing, circuitry in the switch 22 determines which input and output ports to connect based on header information in the data that is being dynamically routed during execution. A tile can send a message to any other tile by generating the appropriate address information in the message header. The tiles along the route between the source and destination tiles use a predetermined routing approach. For example, one routing approach is shortest Manhattan Routing (also known as dimension-ordered routing), which refers to routing along a first dimension followed by a second perpendicular dimension (where the distance between two points is measured by adding line segments that are arranged in a grid like pattern, with the line segments at right angles to each other, and not the straight line joining the two points). The number of hops along a route is deterministic but the latency depends on the congestion at each tile along the route. Examples of data traffic that would typically use dynamic routing are memory access traffic (e.g., to handle a cache miss) or interrupt messages.

The switch 22 includes dedicated circuitry for implementing the dynamic routing. Each tile has a set of data paths, buffers, and switching circuitry for dynamic routing, forming a "dynamic network" for the tiles. There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

The switch 22 is coupled to the processor 20 over processor coupling wires 36. To improve the latency of dynamic routing switches the tiles can use route prediction in the switches. With route prediction, a message that comes into an input port of the switch is routed to a given destination port of the switch based on a predicted port number. The prediction for a packet coming in from a given input port can be selected based on the route taken by the previous packet from that input port. If the hardware in the tile (e.g., prediction circuitry) determines that the prediction was incorrect, the hardware can take a few extra cycles to make the right routing decision based on the information in the packet header.

Other optimizations include using wide network channels. A tile can send single word messages containing both the packet header and the data value. The packet header includes information such as route information.

A tile 14 can include various types of memory modules to serve as the instruction memory 28, data memory 30, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 14 or the integrated circuit 10. Such external memory (e.g., DRAM) is accessible over high bandwidth paths of one or more dynamic networks. The amount of memory can be chosen to roughly balance the areas devoted to processing and memory, and to match the memory access time and the processor clock.

Functions such as virtual address translation, caching, global shared memory and memory protection can be implemented by any combination of hardware and software (e.g., processor instructions). A tile 14 can include a translation lookaside buffer (TLB) to translate virtual addresses as they come out of the processor 20 on each tile 14. Separate TLBs for instruction and data can also be used. A mode bit for each can turn off translation. Events such as cache miss or translation fault can trigger a trap or interrupt to the processor 20, so that the processor 20 can handle the event in software (using instructions executed by the processor).

The software running on the processor 20 can also use various mechanisms to speedup TLB miss handling. For example, a software TLB miss handler can also maintain a software cache of TLB entries. This software cache used by the software TLB miss handler is also called a TSB.

For example, there can be multiple trap lines (conductors carrying trap signals) to the processor 20. Alternatively, there are few trap lines, but there is a trap vector that the processor 20 can access which encodes the type of trap that occurred. There is a mode indicator, which can allow selecting whether the software or the hardware handles these events. A hardware cache tag file can export a hit/miss status to the software rather than stalling the processor pipeline.

An array 12 of tiles 14 can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

The configuration of the circuitry in a tile 14 can be controlled by local control information stored in the tile. For example, a module in the tile can be turned on or off (to save power for example) or configured into a variety of modes (e.g., to set protection levels) based on the state of a "mode indicator" (e.g., one or more bits) stored in a register or other memory store.

Various parts of the multicore chip, for example, a tile, a processor in a tile, a processor and caches in a tile, can also be selectively shut off to save power. When doing so, the system takes care to selectively shut off or activate certain parts of the tile that are needed for other parts of the system to operate. For example, if a tile's cache is the home cache for a given set of cache lines, then that tile's cache controller and cache might be powered up. Alternatively, they might take a set of actions before they are powered down. These actions can transfer responsibility of processing to other parts of the chip.

As line rates of traffic increasingly rise, it is often not possible to timely execute all of the required applications completely in software. For such cases, a processor 20 can include accelerator circuitry to speedup processing for special functions such as security, compression, network packet processing, etc. The accelerator circuits (accelerators) can be connected directly to a tile or a core, or they can be connected to the periphery of an interconnection network (for example, like an I/O device). The accelerators can also be full participants in coherence protocols and can contain caches. They can also use cache coherence transfers to transfer data between them and the other cores, or they can use DMA (direct memory access) to transfer data from the caches on the rest of the chip to the accelerator memory or caches.

A software system for the tiled integrated circuit 10 includes a compiler that is able to schedule instructions for the processors in each of the cores.

An exemplary operating system (OS) for the integrated circuit 10 can include a Linux-like kernel or a similar kernel running on a single tile 14. The OS can be a symmetric multiprocessing OS such as SMP Linux which can run on one or more tiles. Threads of SMP Linux running on multiple tiles communicate with each other through coherence shared memory. Alternatively, the OS can be a distributed OS running on multiple tiles sending messages to each of the processes on each of the tiles.

Another software system component that can be included is a hypervisor layer that provides physical device drivers for each physical device. The hypervisor also sets protection levels in the hardware. The hypervisor is responsible to multiplex various operating systems on the physical hardware and physical devices.

Application writers can program each of the cores or tiles in the multicore chip using languages such as C. Similarly, they can program multiple tiles by writing parallel programs using libraries such as pthreads, Message Passing Interface (MPI), or parallel languages such as OpenMP.

The software system can also include libraries that provide additional function such as interfaces that allow the user to access various hardware features directly, such as the registers related to the network, special purpose registers, synchronization operations, user-level message passing, etc.

Various performance enhancements can be made to the distributed cache coherent environment for a multicore processor system. The caches with associated cache controllers contained in the cores (or tiles) form a larger shared cache system for the memory references to an external memory from any of the cores. In other words, a union of all caches (for example, Level 2 caches) in the system serves as a higher level unified cache (for example, level 3 cache). The cache controllers handle cache access and maintain coherence among caches of different cores. Latency reduction techniques for the larger shared cache system are applied to further optimize the memory operation performance. Several features also enable the software executing on the processors of the cores to control cache partition and utilization from the processor and the I/O system while maintaining coherence.

2 Implementing Hierarchical PCI Express Switch Topology Over a Coherent Mesh Interconnect.

Described below are techniques for implementing a hierarchical PCI Express (PCIe) switch topology within a coherent mesh interconnect by using PCIe base address range definitions (BAR's) for choosing coordinates towards each attached PCIe controller, where each PCIe controller is responsible for one wide PCIe port. All cores in the coherent mesh interconnect have one single root port and the core's load/store transactions towards PCIe BAR defined addresses ranges are routed through the mesh interconnect as memory mapped IO using coherent protocol packets. This scheme effectively implements a first level of PCI Express switch without using PCIe transaction layer packets (TLPs).

At the mesh edges, a protocol bridge coverts the coherent memory protocol packets to PCIe transaction layer packets (TLPs). The bridge may further implement a second of level PCI Express switch functionality, enabling bifurcation of a wide port to multiple narrower downstream ports. The PCIe controller implements the PCIe transaction on each of the downstream ports.

Figure 2:
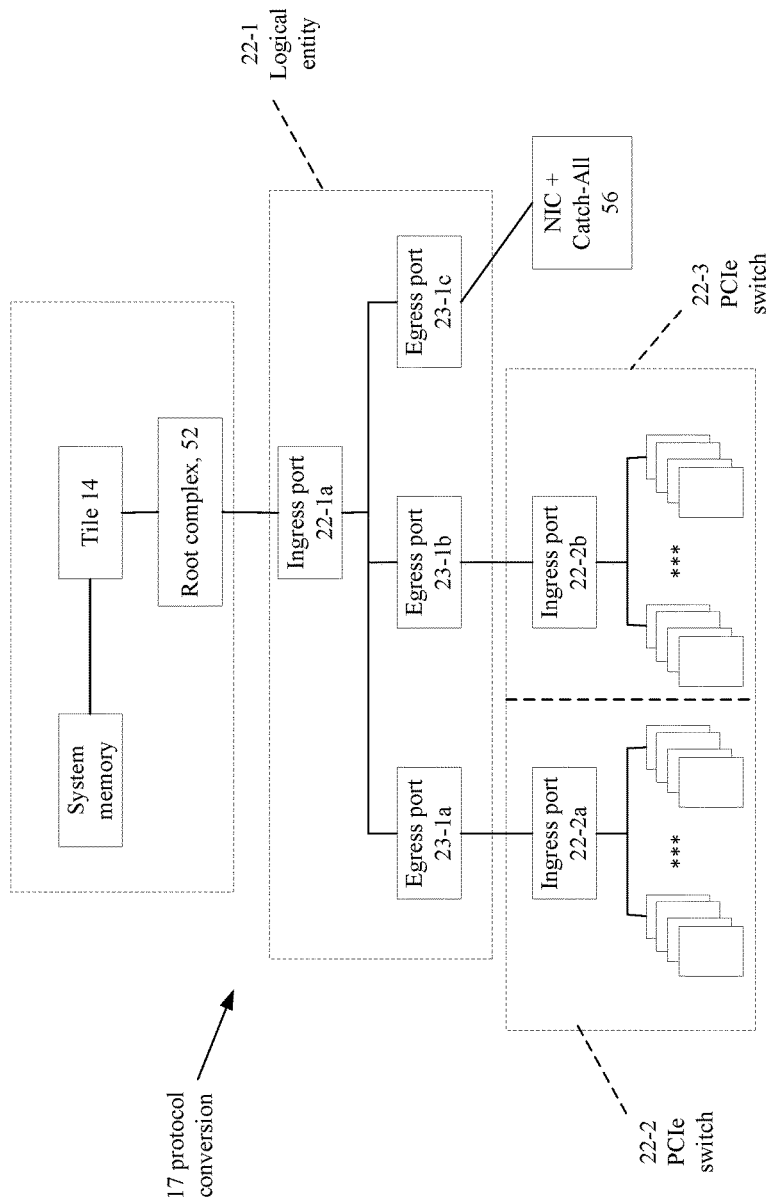
FIG. 2 is logic level block diagram.

Referring now to FIG. 2, a logical view of a PCIe switch topology over a coherent to mesh interconnect that implements the entity 17 (FIG. 1) is shown. At a first level a root complex with the single root port is shown comprising system memory and a processor 20 in communication with RP 52, where RP is a root port, a top level in the PCIe standard where configuration transactions originate. Physically there can be multiple such cores distributed in tiles, and each core sees the same view of a logical hierarchy. At a second level is a logical entity 22-1 of a PCIe switch that is implemented as mapping table. This logical entity 22-1 using the mapping table selects destination coordinates of the PCIe protocol bridge based on BAR matches. Packet routing to that destination is used for multiple switches 22 of the mesh associated with the Tile 14 that couples to the mesh 16. The logical entity 22-1 has an ingress port 22-1*a*, coupled to the RP 52 and egress ports 23-1*a*-23-1*c* coupled to ingress ports of PCIe switches 22-2 and 22-3 (implemented at the PCIe controller), as well as a network interface card (NIC) having a catch-all 56, discussed below. In the general, the catch-all 56 need not be in a NIC. The catch-all merely needs to be a single destination that is the default target for all configuration accesses and that handles enumeration and configuration of on-device PCIe switch components.

Figure 3:
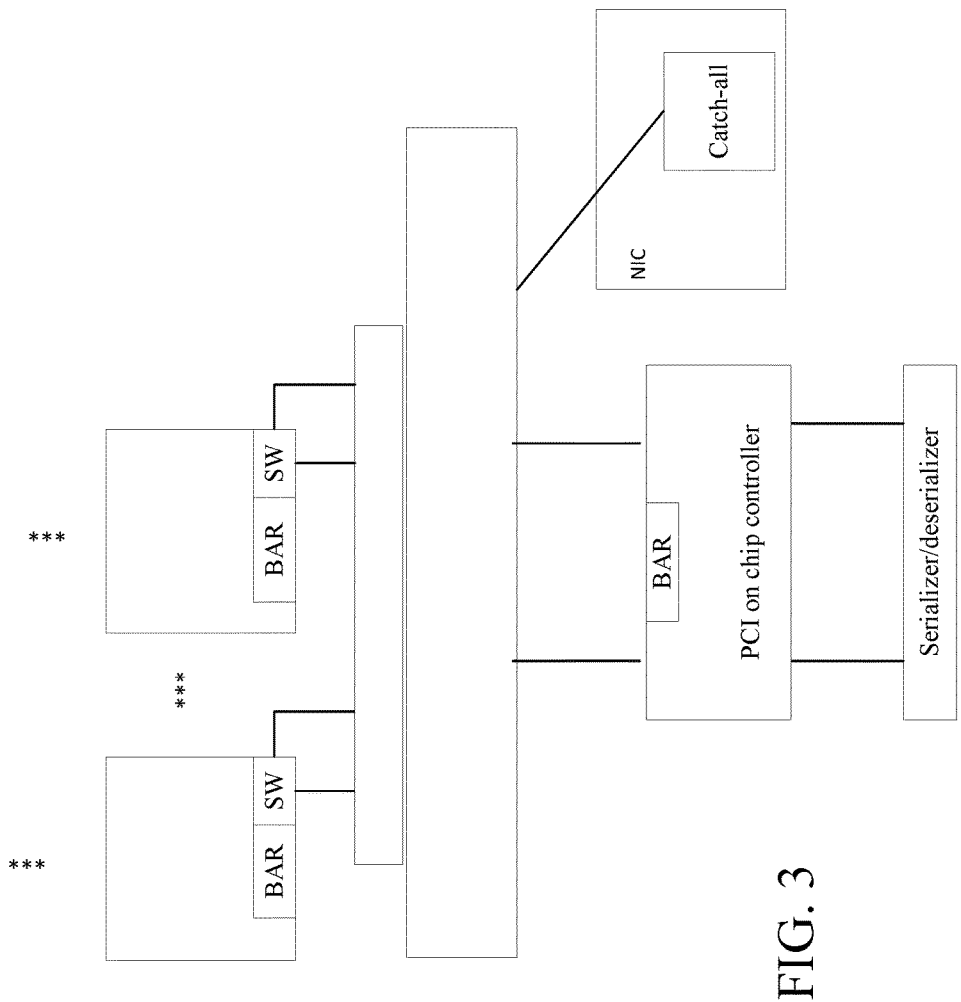
FIG. 3 is a block diagram.

Referring now to FIG. 3, the mesh network 16 for the system of FIG. 1A implemented with hierarchical PCI Express (PCIe) switch topology, within the coherent mesh interconnect 16 includes a BAR set for matching physical addresses of coherent mesh protocol transactions, to IO space, and onto PCIe controller locations. This BAR set is replicated in each tile 14 and emulates functionality of a first level PCIe switch. The mesh interconnect 16 carries memory mapped (MMIO) transactions from all tiles 14 of one multiple wide IO interface. The arrangement also includes a second level of BAR sets that are implemented in each wide PCIe controller that emulates the functionality of a second level PCIe switch by translating coherent mesh protocol transactions to the PCIe transaction layer packets (TLPs). The arrangement also includes partitioned PCI interfaces that are each connected to lanes of a Serializer/Deserializer that is a pair of functional blocks for all downstream ports that are under a single PCIe controller's supervision, according to a particular bifurcation (splitting of a single wide PCIe lane into narrower PCIe lanes).

The arrangement also includes a "catch-all" target. A catch-all is a term that defines a logical structure implemented in a dedicated entity (e.g., dedicated programmable unit) that includes firmware, and which catches all memory mapped I/O transactions that do not hit a BAR. In some implementations a dedicated device is used in others the firmware can be included in a network interface card (NIC). The catch all also intercepts all PCI configuration accesses that target on-device switch hierarchies and that do not hit a configuration space BAR. Selection of the "catch-all" target at the tile 14 level, intercepts PCI configuration accesses and facilitates enumeration of the internal switch levels. This "catch-all" target manages the root complex configuration by intercepting the configuration request targeting a PCIe port configuration register. The catch-all parses the request and emulates the side effect of any PCIe configuration register by configuring multiple peripheral registers spread across the SOC. The catch-all also completes the configuration request. The configuration of all bridge ports that are internal to the on-device switch functionalities are emulated in similar manner, and write to BAR configuration registers spread in the tiles as part of that sequence.

The target for configuration transactions is adjusted. This can be illustrated by an example. For instance, with a bus enumeration example, a bus enumeration process for PCIe is a systematic recursive flow that gradually reveals a topology of switches, the number of each switch downstream ports etc. On every section that is on the device switch or has not yet been revealed as topology outside the device, the catch-all port is selected by missing the BARs, and the catch-all provides the details of the queried switch. The catch-all emulates PCI configuration registers of that port as well as the number of downstream ports of the switch. Eventually when configuration transactions traversing the internal switch are expected to be further routed outside the device for external enumeration, the block in the catch-all target configures multiple on-device registers, including the configuration BARs in all tiles, such that the physical target for those configuration cycles go to the actual PCI express port.

A similar flow is done for PCI data packets that target memory allocated by the operating system. Any such allocation is resulting in configuring the BAR registers on all tiles such that the physical PCIe port will be the target of the packet routing during the configuration flow, such that configuration accesses that exit the SOC are routed to the target PCIe downstream port, while configuration accesses targeting the root complex port or internal switch ports are routed to the "catch-all" target. The arrangement also includes a mechanism for coordinated configuration on distributed locations which collectively implements all required updates for a single PCIe configuration transaction in an atomic sequence.

The PCIe standard defines the so called "Enhanced Configuration Access Mechanism" or "ECAM" where read and write transactions are initiated using standard memory address that have unique translations to PCIe configuration assesses to the selected bus, device and function. The ECAM is used for identifying PCIe configuration accesses at the tile. Routing to the catch all is triggered only for those accesses that target internal root complex port on internal switch ports.

The arrangement also includes complementary configurations for routing upstream traffic arriving from downstream ports, which target either the root complex memory system or peer-to-peer transactions to other downstream ports. These configurations are also updated in an atomic sequence of PCIe switch configurations.

Figure 4:
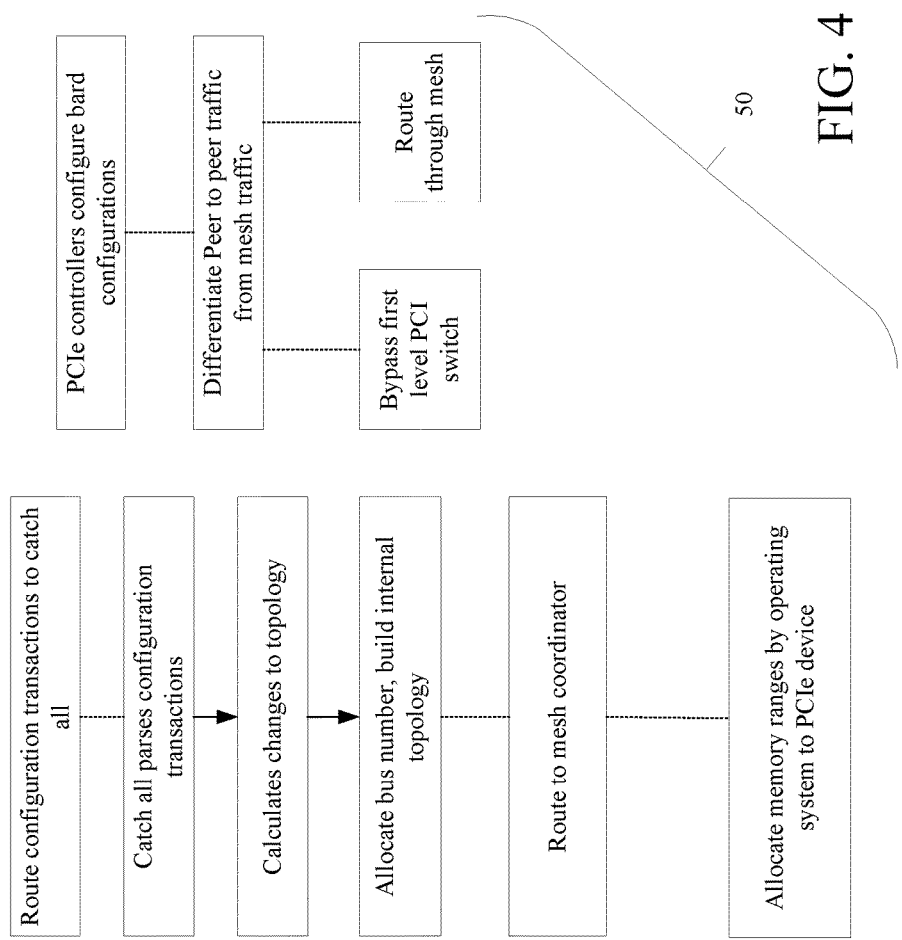
FIG. 4 is a flow chart.

Referring now to FIG. 4, initially all configuration cycles are routed to the "catch-all" entity. That target uses a firmware program that hijacks the transaction request, translates the request into a series of SOC register configurations and updates its internal databases, and completes the original memory transaction towards the initiating core. The firmware calculates impact to the PCIe topology and configures distributed registers to properly route upstream and downstream traffic. Bus numbers are allocated such that any configuration level 0 transaction targeting bridge configuration space within the top two levels is routed to the catch-all entity, which virtually represents the internal PCIe topology. Level 0 configuration transactions that target external PCIe devices or other switch topologies use the previously built PCI topology, and are routed to a mesh coordinate connected to the appropriate PCIe controller. Through that PCIe controller the root port configuration is further routed to the downstream port (and additionally converted at that point to a PCI TLP).

After all busses are probed and enumerated, and the operating system interacts with drivers and obtains endpoint device memory requirements, memory ranges are allocated by the operating system to the PCIe devices. The bridge ports belonging to the on-device switch only expose configuration space meaning that the PCI standard configuration registers of each internal bridge are emulated by firmware and do not require memory. External ports as well as endpoint devices may expose additional BARs and get continuous address allocation from the operating system.

Each configuration access is routed to the catch-all entity that updates the BAR set on all tiles, and the BAR sets on the PCIe controller devices for both upstream and downstream routing. By matching the hierarchical switch topology to the actual mesh and PCIe controller organizations, the technique assures that continuous address ranges are allocated at the first level of the switch topology implemented at the tiles, and other continuous address ranges are configured at the PCIe controller second level switches towards the downstream ports.

The BAR configurations and additional upstream traffic mappings are configured at the PCIe controllers. The PCIe controllers differentiate peer to peer traffic that is routed from one PCIe controller to another PCIe controller, as PCI TLP packets, from traffic targeting root complex memory that is converted to the coherent bus protocol and routed through the mesh interconnect to the coherent memory system (converted to coherent but transactions). This configuration effectively "flattens" the BAR view used for routing of upstream packets and bypasses the first level of PCIe virtual switch, avoiding routing into the mesh array.

At the end of the enumeration process and address allocation sequences, all downstream and upstream data transactions are correctly routed to the target port, all configuration accesses that target on a device root complex or switch ports are routed to the catch-all target, and all configuration accesses targeting ports outside the SOC are routed to the appropriate downstream port. Upstream traffic targeting peer to peer is identified in each of the PCIe controllers and either is routed directly to another PCIe controller under which the target downstream port resides or is routed in a downstream direction within the local PCIe controller in case the downstream port resides under the local topology. The PCI switch emulated at the tiles is physically bypassed, on peer to peer upstream traffic, and PCI TLPs are passed directly between the PCIe controller interfaces, effectively implementing the first level of PCI switch without physically going to the mesh interconnect.

While some platform implementations may route all transactions from a single root complex to single aggregation point, where the protocol is converted to PCIe and a full switch is attached thereafter, such implementations may encounter bandwidth related issues due to either routing congestion or translation block performance.

Other platform implementations may distribute routing to multiple points, using fixed partitions of a physical address range to route PCI IO transactions towards each direction, at which a translation block and PCIe controller are located. In such an implementation it is assumed that fixed ranges in each direction belong to the same continuous address range in a PCI topology and that there could be gaps between ranges belonging to different topologies. The problem with this approach is that address allocations provided by the Operating System after the enumeration sequence, may not be arranged in continuous manner and no proper match might be found between the PCIe topology and a chosen route direction.

These problems are addressed by having a notion of PCI configurations at the tile level. Due to the repetitive nature of multicore mesh array where symmetric cores are placed in tiles, performance scaling problems are reduced by including PCIe switch BARs at each tile based on final physical address. Routing decisions at the tile level choose which protocol translation block to target at edges of the mesh array. These routing decisions are taken while a transaction is still native in the mesh (i.e. part of the coherent interconnect protocol) and is not yet at PCIe TLP format. The protocol translation block or the PCIe controller may implement a second level for the PCIe switch either before or after the coherent bus transaction has been translated to PCIe TLP.

The other problem addressed in the solution deals with handling BAR scalability, and matching the addresses allocated by the operating system to a standard PCI Root Complex driver.

The system 10 can include a relatively large switch, where each PCIe Controller supports bandwidth of up to sixteen PCIe Gen 4 lanes, and these lanes can be further partitioned into multiple narrower downstream ports. System on chip lanes are bifurcated to fine grained granularities instead of having one ×16 port. The number of ports dictates the number of BARs allocated by the OS. In order to fit any possible address allocation scenario, for each SOC downstream port a separate BAR set is needed, along with subordinate bus ranges. Duplicating the full configuration in each tile results in high area and power consumption.

This BAR scaling problem is solved by implementing the hierarchical switch topology, where the first switch level under the root complex is programmed in each tile, choosing which PCIe controller to target, and the second switch level implementing port bifurcation under the same PCIe controller is configured once (at the protocol converter for downstream routing, or at the PCIe controller for upstream routing). The protocol translation block at the edge of the mesh array handles the bandwidth of a single PCIe wide port, converts coherent protocol downstream transactions that have been carried over the coherent interconnect PCIe TLPs, and marks the selected downstream port. The marked TLP progresses as standard PCIe transactions through the PCI Express controller to devices outside the SOC.

Another problem resulting from distributed BAR configuration is the atomicity of PCI configuration transactions. The distributed BAR configuration requires that a single configuration transaction initiated by the Root Complex driver is handled atomically, meaning that all of the distributed configuration registers are viewed as being updated at once. The ECAM approach is used to initiate PCI configuration transactions through detection of configuration address ranges.

The atomicity problem is solved by handling PCI configuration transactions by firmware and associated hardware as an atomic sequence of derived register configuration accesses. Every load/store to a configuration register belonging to port of the internal switch is sent to a predefined mesh location, intercepted by firmware, results in a series of SOC level register accesses initiated by the firmware. The original configuration transaction is completed only after the entire set of registers has been configured to the required values.

Handling Message Signaled Interrupts

Each bridge port belonging to the on-device topology exposes configuration space and supports MSI (message signaled interrupts). The bridge port does not expose memory ranges and therefore does not support the MSI-X (MSI extended) protocol. The MSI range of the all ports is emulated by the catch-all entity. The solution can also support MSI-X by adding address ranges for interrupt tables, however it is not considered as a restriction for bridge ports to use only MSI. Exposing MSI-X tables would need to add BAR and address comparators for each virtual hierarchy to map the MSI-X table. Using MSI and not MSI-X, eliminates the need for such table and the associated waste in hardware. MSI-X is not needed for bridge ports.

3 Additional Systems

Various features of the techniques described herein can be implemented on the multi-core processor based systems as described in U.S. Pat. Nos. 7,577,820, and 7,805,575, and commonly-owned U.S. patent application Ser. Nos. 12/028, 002, 12/582,443, and 12/885,957, each of which is incorporated herein by reference in its entirety.

Various techniques described herein can be implemented in additional types of integrated circuit architectures. For example, some techniques can be used in an integrated circuit with a single processor core, or an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units. Some techniques can be used in parallel processing environments that include multiple processes executing on a single processor, or multiple single-core and/or multi-core processors.

It is to be understood that the foregoing description is intended to illustrate and not to limit the scope of the invention, which is defined by the scope of the appended claims. Other embodiments are within the scope of the following claims.

What is claimed is:

1. A system comprises:
   a multicore processor device comprising:
   a plurality of cores, with multiple ones of the plurality of cores each comprising
      a processor; and switching circuitry configured to couple the processor to a network among the plurality of cores to provide a coherent mesh interconnect; the system configured to:
  choose coordinates according to base address range defined sets towards one or more attached peripheral serial interconnect base controllers, where each peripheral serial interconnect base controller is responsible for one wide peripheral serial interconnect base port to provide a portion of a hierarchical serial interconnect switch topology within the coherent mesh interconnect that interconnects the plurality of cores in the multi-core processor; and
  route load/store transactions from the cores interconnected by the coherent mesh interconnect, towards the peripheral serial interconnect base address range sets defined addresses ranges, as memory mapped IO transactions using coherent protocol packets.

2. The system of claim 1 wherein the system implements a first level peripheral serial interconnect base switch without using peripheral serial interconnect base transaction layer packets.

3. The system of claim 1 wherein a protocol for the peripheral serial interconnect base is a PCI Express® protocol and the base address range definitions are base transaction layer packets that are of the PCI Express protocol.

4. The system of claim 1 further comprising:
  a set of base address registers at each core, which are configurable with the base address registers for matching physical addresses of coherent mesh protocol transactions to I/O space and onto PCIe controller locations with the base address registers set replicated in each tile and with the base address registers set configured to emulate functionality of a first level PCIe switch.

5. The system of claim 1 wherein the base address registers are atomically configurable at tiles and at edge peripherals to build a 2-level switch topology.

6. The system of claim 1 wherein the system intercepts all configuration accesses that target an on-device switch hierarchies and that do not hit a configuration space of base address ranges with a catch all logical structure that includes a firmware program implemented in dedicated programmable unit.

7. The system of claim 6 wherein a protocol for the peripheral serial interconnect base is a PCI Express protocol and the catch-all target manages a root complex configuration by intercepting the configuration request targeting a PCIe port configuration register.

8. The system of claim 6 wherein the catch-all parses the request and emulates the side effect of any PCIe configuration register by configuring multiple peripheral registers and completes the configuration request.

9. The system of claim 6 wherein initially all configuration cycles are routed to the catch-all.

10. The system of claim 3 wherein each configuration access is routed to the catch-all entity that updates the BAR set on all tiles, and the BAR sets on the PCIe controller devices for both upstream and downstream routing.

11. A method comprising:
  choosing coordinates according to base address range sets towards one or more attached peripheral serial interconnect base controllers, where each peripheral serial interconnect base controller is responsible for one wide peripheral serial interconnect base port to provide a portion of a hierarchical serial interconnect switch topology within a coherent mesh interconnect that interconnects a plurality of cores of multi-core processor; and
  routing load/store transactions from the cores interconnected by the coherent mesh interconnect, towards the peripheral serial interconnect base address range sets defined addresses ranges, as memory mapped IO transactions using coherent protocol packets.

12. The method of claim 11 wherein the method effectively implements a first level peripheral serial interconnect base switch without using peripheral serial interconnect base transaction layer packets.

13. The method of claim 11 wherein a protocol for the peripheral serial interconnect base is a PCI Express protocol and the base address range definitions are BARS that are of the PCI Express protocol.

14. The method of claim 11 further comprising:
  configuring a set of base address registers at each core with the base address registers for matching physical addresses of coherent mesh protocol transactions to I/O space and onto PCIe controller locations with the base address registers set replicated in each tile and with the base address registers set configured to emulate functionality of a first level PCIe switch.

15. The method of claim 11 further comprising:
  atomically configuring base address registers at tiles and at edge peripherals to build a 2-level switch topology.

16. The method of claim 11 further comprising:
  intercepting all configuration accesses that target an on-device switch hierarchies and that do not hit a configuration space of base address ranges with a catch all logical structure that includes a firmware program implemented in a network interface card.

17. The method of claim 16 wherein a protocol for the peripheral serial interconnect base is a PCI Express protocol and the catch-all target manages a root complex configuration by intercepting the configuration request targeting a PCIe port configuration register.

18. The method of claim 16 wherein initially all configuration cycles are routed to the catch-all, and the catch-all parses the request and emulates the side effect of any PCIe configuration register by configuring multiple peripheral registers and completes the configuration request, and each configuration access is routed to the catch-all entity that updates the base address range sets on all tiles, and the base address range sets on the PCIe controller devices for both upstream and downstream routing.

19. A computer program product tangible stored in a computer readable, hardware storage device, the product for implementing a hierarchical serial interconnect switch topology within a coherent mesh interconnect that interconnects a plurality of cores in a multi-core processor, the computer program product comprising instructions to cause a processor to:
  choose coordinates according to base address range defined sets towards one or more attached peripheral serial interconnect base controllers, where each peripheral serial interconnect base controller is responsible for one wide peripheral serial interconnect base port to provide a portion of a hierarchical serial interconnect switch topology within the coherent mesh interconnect that interconnects the plurality of cores in the multi-core processor; and
  route load/store transactions from the cores interconnected by the coherent mesh interconnect, towards the peripheral serial interconnect base address range sets defined addresses ranges, as memory mapped IO transactions using coherent protocol packets.

20. The computer program product of claim 19 wherein the system implements a first level peripheral serial interconnect base switch without using peripheral serial interconnect base transaction layer packets.

* * * * *